United States Patent
Ochs et al.

(10) Patent No.: US 10,326,390 B2
(45) Date of Patent: Jun. 18, 2019

(54) SYSTEMS AND METHODS FOR OPERATING MOTORS WITH A SINGLE MOTOR POSITION SIGNAL

(71) Applicant: GM GLOBAL TECHNOLOGY OPERATIONS LLC, Detroit, MI (US)

(72) Inventors: David S. Ochs, Troy, MI (US); Yo Chan Son, Rochester Hills, MI (US); Caleb W. Secrest, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 5 days.

(21) Appl. No.: 15/658,132

(22) Filed: Jul. 24, 2017

(65) Prior Publication Data
US 2019/0028044 A1  Jan. 24, 2019

(51) Int. Cl.
| | |
|---|---|
| *H02P 6/08* | (2016.01) |
| *H02P 6/17* | (2016.01) |
| *G01S 5/14* | (2006.01) |
| *H02P 21/18* | (2016.01) |

(52) U.S. Cl.
CPC ............ *H02P 6/17* (2016.02); *H02P 6/08* (2013.01); *G01S 5/14* (2013.01); *H02P 21/18* (2016.02)

(58) Field of Classification Search
CPC ..... H02P 6/08; H02P 6/17; H02P 21/18; G01S 5/14
USPC .......................... 318/400.07, 400.02; 342/140
See application file for complete search history.

(56) References Cited

U.S. PATENT DOCUMENTS

| | | | | |
|---|---|---|---|---|
| 5,920,278 A | * | 7/1999 | Tyler ........................ | G01S 5/14 342/140 |
| 2013/0207579 A1 | * | 8/2013 | Perisic .................... | H02P 21/18 318/400.02 |

* cited by examiner

*Primary Examiner* — Eduardo Colon Santana
*Assistant Examiner* — Zemenay T Truneh
(74) *Attorney, Agent, or Firm* — Lorenz & Kopf, LLP

(57) ABSTRACT

Systems and method for operating motors are provided. In an exemplary embodiment, a method for operating a motor includes receiving a first output corresponding to a motor angular position. The method further includes synthesizing a synthesized second output from the first output and from an estimated motor angular velocity. The method also includes calculating the motor angular position from the first output and the synthesized second output. The method includes estimating the motor angular velocity from the motor angular position. Further, the method includes operating the motor to produce torque based on the motor angular position and the motor angular velocity.

22 Claims, 10 Drawing Sheets

SYSTEMS AND METHODS FOR OPERATING MOTORS WITH A SINGLE MOTOR POSITION SIGNAL

INTRODUCTION

Motor systems, such as permanent magnet alternating current (PMAC) motor systems, may be utilized in many different applications and are well-known in the art. Some motor systems include a motor connected to each phase of a three-phase inverter, and a controller connected to the motor and the three-phase inverter in a configuration known as a three-phase motor.

The three-phase inverter is configured to provide voltage to the motor to control the amount of torque produced by the motor. To do this, each inverter phase is coupled between a voltage source and the motor, and includes a pair of (e.g., a high-side and a low-side) field effect transistors ("FETs") or other type of solid state switching devices that, via their switching operations (i.e., ON/OFF functions), control the amount of voltage provided to the motor. The switching operations of the switching devices are typically controlled using pulse-width-modulation ("PWM") techniques. Specifically, the switching devices are connected to provide three-phase voltage to the A, B, and C phases of the motor. During operation, the A, B, and C phases of the motor are maintained 120 degrees (electrical) apart. For example, if phase A is at 120 degrees (i.e., θ=120°), then phase B would be at phase A plus 120 degrees (i.e., θ+120°), and phase C would be at phase A minus 120 degrees (i.e., θ−120°).

The amount of torque produced by the motor is functionally related to the amplitude of the electric current in the A, B, and C phases, which is also referred to as the motor current. The frequency of the motor current is selected to create a magnetic field or flux in the phase windings that rotates about an armature at a predetermined speed, which induces a rotor in the motor to rotate. The rotational speed of the rotor is thus determined by the amplitude and frequency of the motor current.

Typically, the rotating flux is commanded to lead the rotor by some angle, which is often referred to as an "advance angle." The advance angle can be controlled by adjusting the phase angle of the current supplied to the motor windings, and is increased as the rotor speed increases, depending on the torque and power requirements of the motor. If the flux is not leading the rotor by the proper advance angle and/or if the flux does not include the proper rotational speed, the motor may experience high currents and/or torque oscillations, which can result in damage the motor system.

To prevent the motor from experiencing high currents and/or torque oscillations, motor systems track the present motor electrical position, i.e., the position of the rotor (or the flux), and the present motor speed at all times. As such, some motor systems include an absolute position sensor, such as a resolver, to synchronize the rotor position and the motor speed. Position sensors typically provide two output signals to be used for control and operation of the motor. For example, a sine envelope signal and a cosine envelope signal may be outputted and used to control and operate the motor.

When one output signal is faulted, such systems may shut down the motor or switch control to a backup source of motor electrical position. Motor shutdown may not be desirable in certain conditions. Further, providing a backup source of motor electrical position typically entails using one or more additional circuits and/or sensors to calculate the motor conditions.

Accordingly, it is desirable to provide systems and methods for operating motors without needing additional circuits and/or sensors to provide a backup source of motor electrical position. Further, it is desirable to provide systems and methods for operating motors with a single motor position signal. Furthermore, other desirable features and characteristics will become apparent from the subsequent detailed description and the appended claims, taken in conjunction with the accompanying drawings and the introduction.

SUMMARY

Systems and method for operating motors, such as permanent magnet alternating current (PMAC) motors, are provided. In an exemplary embodiment, a method for operating a motor includes receiving a first output corresponding to a motor angular position. The method further includes synthesizing a synthesized second output from the first output and from an estimated motor angular velocity. The method also includes calculating the motor angular position from the first output and the synthesized second output. The method includes estimating the motor angular velocity from the motor angular position. Further, the method includes operating the motor to produce torque based on the motor angular position and the motor angular velocity.

In an exemplary embodiment, the first output corresponding to the motor angular position is a sine envelope signal or a cosine envelope signal. In an exemplary embodiment, a vector-based position sensor coupled to the motor provides the first output. In another exemplary embodiment, the first output is created by a resolver, a magneto-resistive sensor, or an eddy current sensor.

In certain exemplary embodiments, the method further includes receiving a second output corresponding to the motor angular position, determining that the first output is not faulted, and determining that the second output is faulted.

In some exemplary embodiments, a quadrature envelope generator synthesizes the synthesized second output from the first output and the estimated motor angular velocity. In such embodiments, the quadrature envelope generator may be a frequency-adapted all-pass filter or a spatial derivative filter.

In exemplary embodiments, the method operates the motor to produce torque based on the motor angular position and the estimated motor angular velocity when the absolute motor speed is greater than or equal to a selected absolute value $|n1|$, and the method further includes identifying that the absolute motor speed is less than the selected absolute value $|n1|$, and, after identifying that the absolute motor speed is less than the selected absolute value $|n1|$, controlling the motor to generate no torque and no current. In such exemplary embodiments, the method may further include, after initially controlling the motor to generate no torque and no current, determining that the absolute motor speed is greater than or equal to a selected absolute value $|n2|$, generating torque with the motor and detecting the direction of rotation of the motor. Also, in certain exemplary embodiments, determining that the absolute motor speed is greater than or equal to a selected absolute value $|n2|$ includes performing a two pulse-per-revolution emulated encoder method or performing a speed ceiling calculation. Further, in certain exemplary embodiments, detecting the direction of rotation of the motor includes performing a three-phase short current-based detection process or performing a current regulator-based detection process.

In certain embodiments, the method also includes determining that the absolute motor speed is greater than or equal to a selected absolute value |n3|, wherein |n3| is greater than or equal to |n2|, and, after identifying that the absolute motor speed is greater than or equal to a selected value |n3|, operating the motor to produce torque. For example, such embodiments may include operating the motor to produce torque based on the motor angular position and the motor angular velocity.

In certain embodiments, the method includes, after initially controlling the motor to generate no torque and no current, determining that the absolute motor speed is greater than or equal to a selected absolute value |n2|, generating torque with the motor and detecting a direction of rotation of the motor, and, after a time interval t1 from determining that the absolute motor speed is greater than or equal to a selected absolute value |n2|, operating the motor to produce torque based on the motor angular position and the motor angular velocity.

In another exemplary embodiment, a method for operating a motor including a rotor, an inverter coupled to the motor and configured to provide a voltage to the motor, and a controller coupled to the inverter and to the motor is provided. The method includes receiving with the controller an output corresponding to a motor angular position and detecting with the controller the absolute motor speed based on the motor angular position. The method includes controlling the motor with the controller to generate no torque when the absolute motor speed is less than a selected absolute value |n1|, and after the motor generates no torque, and when the absolute motor speed is greater than or equal to a selected absolute value |n2|, generating torque with the motor and detecting a direction of rotation of the motor; and controlling the motor with the controller to generate torque when the absolute motor speed is greater than or equal to a selected absolute value |n3| greater than or equal to |n2|.

In an exemplary embodiment, the output corresponding to the motor angular position is a sine envelope signal or a cosine envelope signal. In an exemplary embodiment, detecting, with the controller, the absolute motor speed based on the motor angular position includes performing a two pulse-per-revolution emulated encoder method. In another exemplary embodiment, a speed ceiling calculation may be performed to detect if the absolute motor speed is less than a selected absolute value. In an exemplary embodiment, detecting the direction of rotation of the motor includes performing a three-phase short current-based detection process or performing a current regulator-based detection process.

In another exemplary embodiment, a motor system is provided. The motor system includes a motor, an inverter coupled to the motor and configured to provide a voltage to the motor, and a controller coupled to the inverter and to the motor. The controller includes control logic configured to perform a unary signal control algorithm for controlling the motor based on only one output signal corresponding to a motor angular position. Also, the controller includes pause logic configured to determine when to pause controlling the motor based on the output signal corresponding to the motor angular position. Further, the controller includes drive logic configured to drive the torque to zero (0) newton meter (N·m) in response to a determined pause of the unary signal control algorithm.

The controller also includes speed detection logic configured to detect an absolute speed of the motor in response to a determined pause of the unary signal control algorithm. The controller includes direction detection logic configured to detect a direction of rotation of the motor in response to detection of the absolute speed above a selected absolute speed. The controller further includes restart logic configured to determine when to restart the unary signal control algorithm based on the absolute speed of the motor.

In an exemplary embodiment, the motor system further includes a vector-based position sensor coupled to the motor and to the controller for outputting the one output signal corresponding to the motor angular position.

In certain exemplary embodiments, the control logic is a contingency control logic, and the motor system further includes primary control logic configured to perform a binary signal control algorithm for controlling the motor based on two output signals corresponding to the motor angular position; and fault detection logic configured to identify that a second output signal corresponding to the motor angular position is faulted and to switch control of the motor from the primary control logic to the contingency control logic.

In another exemplary embodiment, a method for detecting a direction of rotation of a motor is provided. The method includes commanding zero current to a synchronous reference frame current controller; generating an angle based on an assumed direction of rotation; performing a direct-quadrature-zero transformation with the angle; inspecting resulting voltage commands; and identifying the assumed direction of rotation as the direction of rotation when the voltage command outputs of the current regulator are substantially constant.

BRIEF DESCRIPTION OF THE DRAWINGS

The present subject matter will hereinafter be described in conjunction with the following drawing figures, wherein like numerals denote like elements, and wherein.

DETAILED DESCRIPTION

Figure 1:
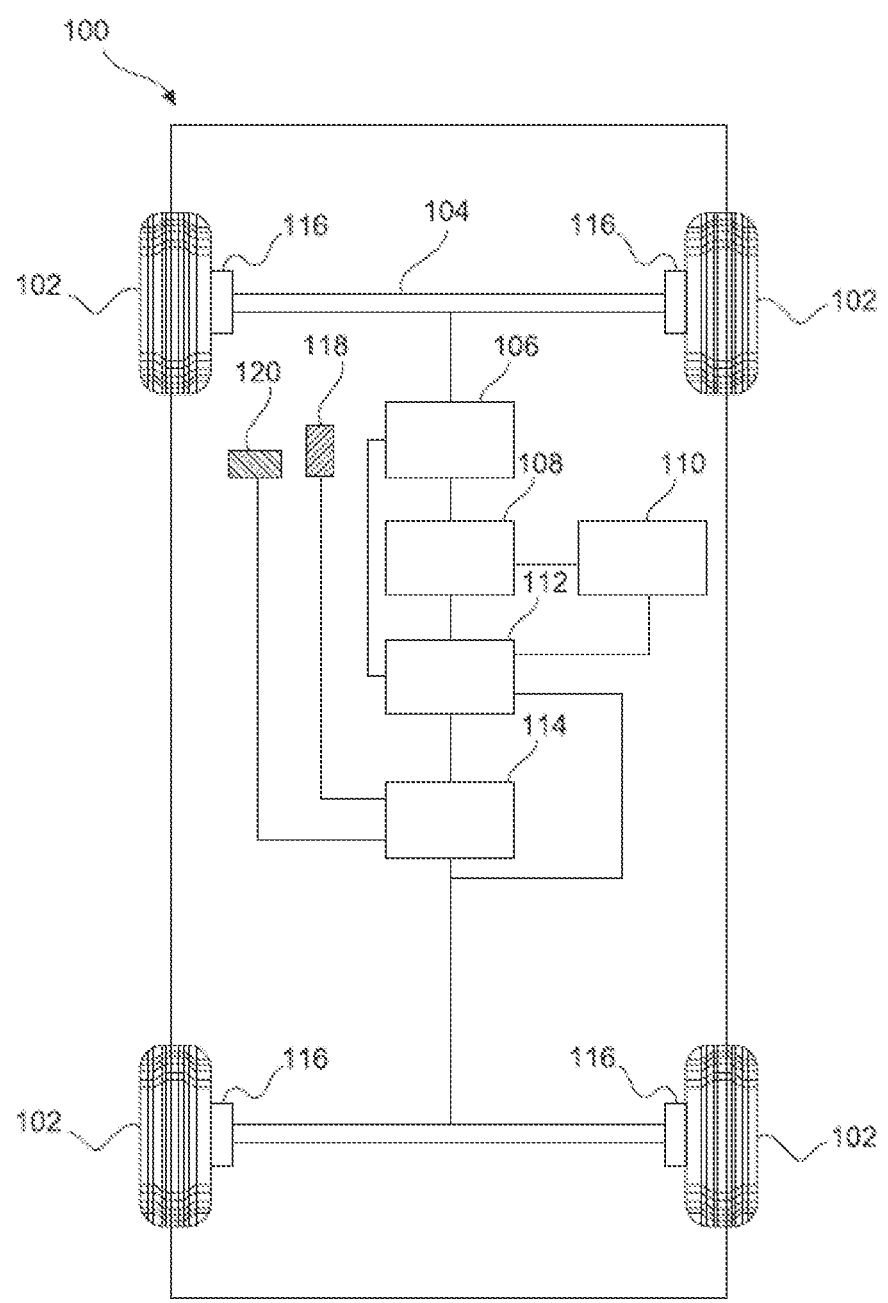
FIG. 1 is a schematic representation of an exemplary embodiment of a vehicle having a permanent magnet alternating current (PMAC) motor system in accordance with embodiments herein.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to vehicle design, vehicle control systems, regenerative braking systems, electric and hybrid electric drivetrains, vehicle-based electronic control units (ECUs), and vehicle-based networking protocols and related architectures may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Embodiments herein provide for a system and method to control operation of a motor based on a single output signal corresponding to a present motor angular position. Such a system and method may be provided as a backup or contingency mode of operation to a primary mode of operation that controls operation of the motor based on two output signals corresponding to a present motor angular position. For example, systems and methods described herein may control operation of a motor based on a sine envelope signal corresponding to the motor angular position and a cosine envelope signal corresponding to the motor angular position during a primary mode of operation.

If one of the signals is faulted or otherwise not available, the systems and methods described herein may control operation of the motor based on the non-faulted signal, so that the motor need not be shutdown when on signal is faulted. A signal is considered to be faulted when position information can no longer be extracted. Examples of faulted signals include those with outputs that are too small or too large to be used, or that include a high amount of noise or interference.

Further, embodiments provided herein address operation of the motor during different speed regimes. For example, a high speed mode of operation may be provided for controlling the operation of the motor at speeds above a selected near-zero speed. When the motor speed nears zero, i.e., is equal to or less than the selected near-zero speed, a low speed mode of operation is provided to pause torque generation by the motor and to determine when to return to the high speed mode of operation.

FIG. 1 is a schematic representation of an exemplary embodiment of a vehicle 100 having a permanent magnet alternating current (PMAC) motor system. The vehicle 100 may be a front-wheel drive vehicle, a rear-wheel drive vehicle, an all-wheel drive vehicle, or the like. The non-limiting embodiment illustrated in FIG. 1 represents a front-wheel drive vehicle. The vehicle 100 may include, without limitation: road wheels 102; at least one drive axle 104; a drive system 106; an electric motor/generator (MOGEN) 108 hereinafter referred to as a motor; an energy storage system (ESS) 110 for the drive system 106; a computer or processor based control system 112, i.e., controller; a number of vehicle sensors 114; a braking system 116; an accelerator pedal 118; and a brake pedal 120.

FIG. 1 depicts the vehicle 100 in a very simplified manner. It should be appreciated that a practical embodiment of the vehicle 100 will include many additional components, subsystems, and elements that cooperate to provide a variety of conventional and ordinary features and functions. For the sake of brevity and clarity, conventional aspects of the vehicle 100 (which may be unimportant or unrelated to the disclosed subject matter) will not be described in detail here.

The drive system 106 delivers traction power to the drive axle(s) 104. The drive system 106 may include, without limitation, a transmission, a torque converter, and an internal combustion engine (for HEV or plug-in HEV vehicles). For ease of illustration, these components are not depicted in FIG. 1. The drive system 106 is suitably designed and controlled to cooperate with the motor 108 and the ESS 110 such that the road wheels 102 (e.g., the front drive wheels for this example) can be driven by the motor 108 using electric energy stored in the ESS 110. The motor 108, the ESS 110, and/or other features and functions of the vehicle 100 are controlled by the control system 112.

The control system 112 may be implemented using one or more onboard electronic control modules. In certain embodiments, the functionality of the control system 112 is distributed among a plurality of physically distinct electronic control modules of the vehicle 100. For example, the control system 112 may include or cooperate with one or more of the following, without limitation: a central control module; an engine control module; a transmission control module; a power inverter module; a braking control module; a body control module; a powertrain control module; and a battery control module. These, and possibly other, modules include the control logic and functional capabilities as might be necessary to operate the vehicle 100 in the desired manner. If so configured, the control system 112 can provide overarching control and coordination of some or all of the aforementioned modules. For simplicity, the control system 112 is represented as a single block, although separate distinct components may also be deployed in an embodiment of the vehicle 100. In certain embodiments, the control system 112 can be configured to provide or support some or all of the functionality of the instrument display system described in more detail below.

The control system 112 (and any individual control module onboard the vehicle 100) can be configured as a general purpose digital computer generally including a microprocessor, a central processing unit, or other form of processor device, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Each set of algorithms resident in the control system 112 (and any individual control module onboard the vehicle 100) or accessible thereby may be stored in ROM and executed as needed to implement the respective functions.

The control system 112 and other functional modules of the vehicle 100 can be implemented using one or more ECUs. For example, the vehicle 100 can include any or all of the following ECUs, without limitation: body control module; center stack module; memory seat module; instrument panel cluster module; rear seat entertainment module; lift gate module; amplifier module; transmission module; climate control (HVAC) module; and engine control module. Although one ECU can manage the functionality described herein, various embodiments may employ a plurality of ECUs to support the functionality in a cooperative and distributed manner. Further, systems may employ, without limitation: at least one processor device; at least one computer-readable memory device or storage medium; and an input/output module (e.g., a suitably configured transceiver) and additional elements, devices, and functional modules that cooperate to achieve the desired functionality. The processor device of control system 112 is capable of executing computer executable instructions stored on storage medium, wherein the instructions cause the ECU to perform the various processes, operations, and functions for which it is responsible. In practice, the processor device of the control system 112 may be implemented as a microprocessor, a number of discrete processor devices, content addressable memory, an application specific integrated circuit, a field programmable gate array, any suitable programmable logic device, discrete gate or transistor logic, discrete hardware components, or any combination designed to perform the desired functions.

Storage medium (and/or any general purpose memory storage device or storage element) may be utilized to store program code that defines an operating system, a boot loader, or a BIOS for the ECU. Moreover, the storage medium may include random access memory that serves as temporary data storage for the processor device. In this regard, the processor device can write to and read from the storage medium as needed to support the operation of the ECU.

An input/output module may be realized using software, firmware, hardware, processing logic, or any suitable combination thereof. In certain exemplary embodiments, the input/output module is suitably configured to support data communication between the ECU and other modules, ECUs, sensors, or devices onboard the host vehicle 100. The input/output module may also be designed to support data communication with external devices or sources. For example, can be used to receive output data from "external" sensors that are not otherwise coupled to the communication network onboard the vehicle 100.

The ESS 110 can be configured as one or more batteries, although other electrical and/or electrochemical energy storage devices having the ability to store electric power and dispense the electric power can be used here. The ESS 110 can be sized based on factors including regenerative braking requirements, application issues related to typical road grade and temperature, and propulsion requirements such as emissions, power assistance, and electric range. Generally, the ESS 110 is a relatively high-voltage direct current (DC) device coupled to a transmission power inverter module (not shown) via sufficiently constructed and routed DC cabling, as will be understood by those of ordinary skill in the art.

The electric motor 108 is mechanically coupled to at least one of the road wheels 102, and is electrically coupled to the ESS 110. The electric motor 108 can operate alternately as a power supplier or as a power generator. When operating as an electric motor or a power supplier, the motor 108, which may be a single unit or multiple units depending on the design of the vehicle 100, supplies power to the drive system 106. When operating as a generator, the motor 108 will receive electrical power from the drive system 106. In this regard, the control system 112 is adapted to route or distribute electrical energy from the motor 108 to the ESS 110 to recharge the ESS 110, and/or to distribute the electrical energy from the ESS 110 to another electrical power unit (not shown), which will be operating as an electric motor at that time.

The vehicle 100 includes a conventional electromechanical or hydraulic friction braking system 116, which utilizes a fluid-actuated pad and/or drum style brake mechanism positioned in proximity to each road wheel 102. The friction braking system 116 provides a frictional braking torque, which can be augmented by an electronic/regenerative braking torque. When a driver or operator of the vehicle 100 depresses a brake pedal 120 to thereby input a force and travel describing a driver-commanded overall braking torque, the friction braking system 116 slows the vehicle 100 via a combination of the friction braking torque and the regenerative braking torque (if available).

Still referring to FIG. 1, the vehicle 100 is also equipped with various sensors 114 that detect or obtain information (referred to herein as vehicle status data) related to the current operating state or condition of the vehicle 100. For example, the sensors 114 may include wheel speed sensors that measure wheel speed and wheel slip data (the vehicle speed, acceleration, and deceleration can be calculated by the control system 112 using the wheel speed data). The sensors 114 may also include sensors that detect the position and/or travel of the brake pedal 120 and the accelerator pedal 118. The sensors 114 may also include sensors that determine the current state of charge of the ESS 110, the charge and/or discharge power of the ESS 110 at any given time, and the temperature of the ESS 110 at any given time. During operation of the vehicle 100, the control system 112 receives real-time vehicle status data by way of input signals corresponding to the different sensors 114, which may be deployed at various locations onboard the vehicle 100. The sensor data can be gathered and processed at any sampling rate, e.g., once every 10 milliseconds.

Figure 2:
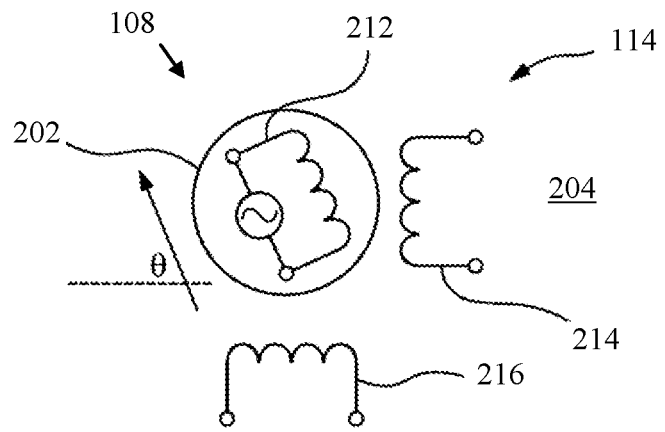
FIG. 2 shows a conventional resolver sensor with rotor excitation for use in the vehicle of FIG. 1 in accordance with embodiments herein.

In an exemplary embodiment, the sensors 114 include sensors coupled to the motor 108 for sensing properties of the motor 108. FIG. 2 illustrates such a sensor 114. In the embodiment of FIG. 2, sensor 114 is a resolver sensor, though other sensors for monitoring an electric position of a motor may be used.

FIG. 2 illustrates the rotor 202 and stator 204 of the resolver sensor 114. As shown, the resolver sensor 114 includes three distinct coil windings: the reference winding 212, the sine winding 214, and the cosine winding 216. Reference winding 212 is mounted to the rotor 202 of the motor 108. Sine winding 214 and cosine winding 216 are mounted to the stator 204 of the motor 108. The sine winding 214 and cosine winding 216 are mounted 90° from each other in relation to the rotor axis.

The reference winding 212 is excited by a sinusoidal AC voltage. The sine winding 214 and cosine winding 216 receive a voltage which is induced by the reference winding 212. The amplitudes of the voltages induced in the sine winding 214 and cosine winding 216 are determined by the angle of the rotor 202 or of the reference winding 212 and correspond to the sine and cosine of the angular position of the rotor 202.

As the rotor 202 spins, the reference winding 212 spins. As the reference winding 212 spins, the angle of difference between the reference winding 212 and sine/cosine windings 214, 216 changes, represented as the theta rotation angle or θ in FIG. 2. Thus, as the motor 108 spins, the voltage output from the sine winding 214 and the cosine winding 216 change according to the rotor shaft position.

While a resolver type sensor 114 is illustrated in FIG. 2, embodiments herein may be applied to systems that sense motor position, such as vector-based position sensors including resolver and magneto-resistive sensors, or other types of sensors including eddy current sensors. Exemplary embodiments of such sensors can be configured to have outputs of the following form:

$$S = A \sin(\theta)$$

$$C = A \cos(\theta)$$

where θ is the angle detected by the sensor or sensing method, which may need to be scaled in order to arrive at the motor electrical position.

$\theta$ = sensed position = (rotor position) ∗ (sensor multiplication factor)

Motor Electrical Position = Rotor Position ∗ Motor Pole Pairs =

$$\frac{(\text{Sensed Position}) * (\text{Motor Pole Pairs})}{(\text{Sensor Multiplication Factor})}$$

For a resolver sensor, the Sensor Multiplication Factor would be the number of lobes.

For some sensors, such as resolver sensors, some processing of the raw sensor signals is needed in order to obtain the envelope signals: S and C. The envelope signals can be processed in different ways to extract θ, and conventional methods require that both S and C be available for the calculation. One method is to take the four-quadrant inverse tangent of the signal envelopes:

$$\theta = a \tan 2(S, C)$$

Figure 3:
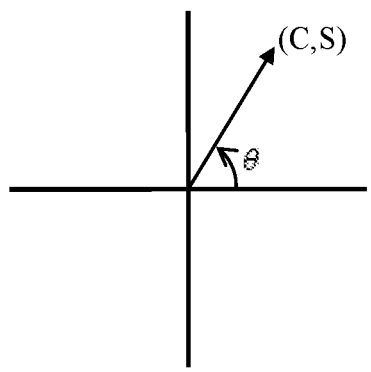
FIG. 3 is a vector diagram illustrating a motor position sensor output in accordance with embodiments herein.

This can be represented graphically as shown in FIG. 3, which is a vector diagram of a sensor output, by plotting envelope signal C on the horizontal axis (cosine) and envelope signal S on the vertical axis (sine). FIG. 3 illustrates that conventional mode of operation becomes unusable if one of the envelope signals is lost:

If $S=0$, Then $a \tan 2(0,C)$ will always be 0° or 180°

If $C=0$, Then $a \tan 2(S,0)$ will ways be 90° or 270°

In conventional operation, if either S=0 or C=0, then the motor must be shut down or the control must switch to a backup source of position information. Embodiments herein provide for continued control of operation of a motor based on only one envelope signal by synthesizing the envelope signal that has been lost using the remaining envelope signal and an estimate of the motor's velocity. For example, if envelope signal S is lost, then the system and method synthesize envelope signal $S_s$ using remaining envelope signal C and an estimate of the motor's velocity. Likewise, if envelope signal C is lost, then the system and method synthesize envelope signal $C_s$ using remaining envelope signal S and an estimate of the motor's velocity.

Figure 4:
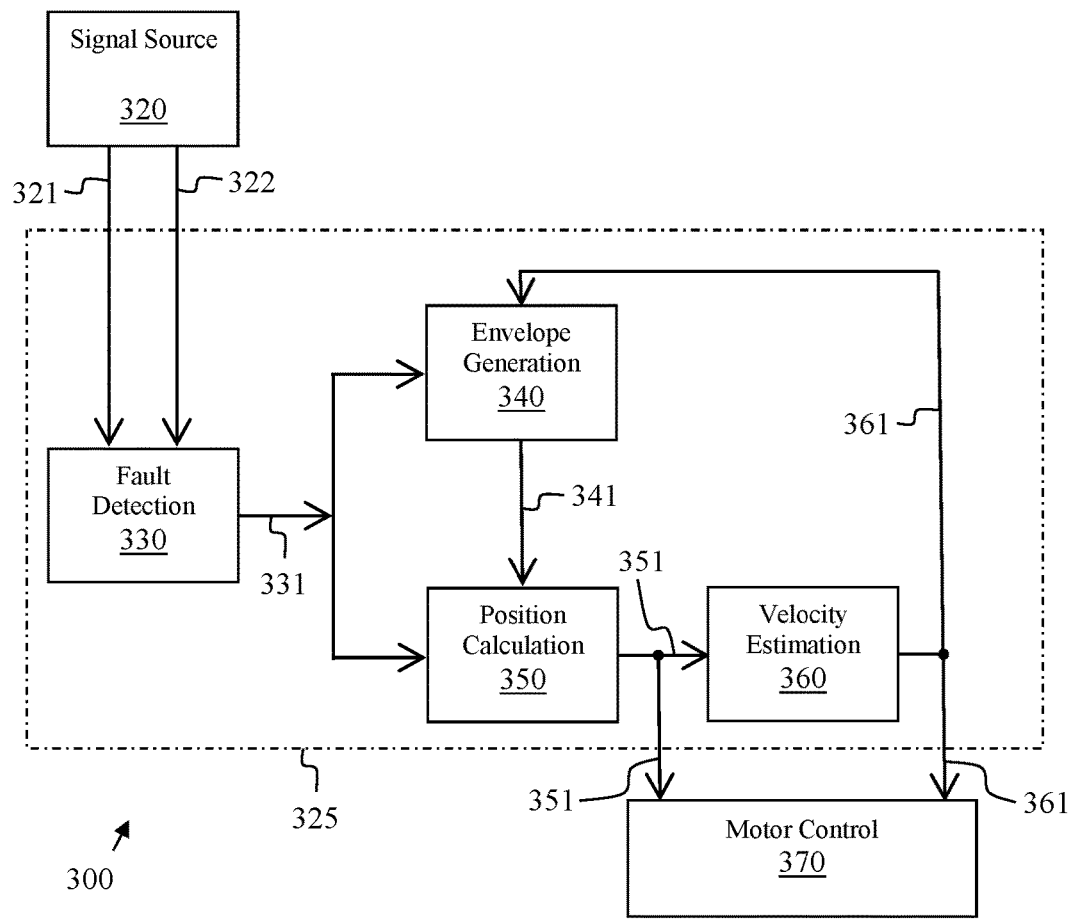
FIG. 4 is a schematic illustrating a system for controlling operation of a motor using one envelope signal when the motor is operating above zero speed in accordance with embodiments herein.

FIG. 4 illustrates a system 300 for controlling operation of the motor when one envelope signal is lost when the motor is operating above zero speed. As shown, a signal source 320, such as a sensor, e.g., sensor 114, provides two signal envelopes or outputs 321 and 322.

In an exemplary embodiment, the signal envelopes 321 and 322 are communicated to control logic 325 configured to perform a unary signal control algorithm for controlling the motor based on only one output signal corresponding to a motor angular position. Specifically, the signal envelopes 321 and 322 are communicated to a fault detection module 330 in control logic 325. The fault detection module 330 determines if one or both of the signal envelopes 321 and/or 322 is faulted and/or has been lost. This may be accomplished by estimating the amplitude of each envelope or the amount of interference present.

If only one envelope 321 or 322 is faulted, the fault detection module 330 determines which envelope 321 or 322 is faulted and which envelope 322 or 321 is still functioning properly as a non-faulted envelope 331.

The non-faulted envelope 331 is then communicated from the fault detection module 330 to an envelope generation module 340 in control logic 325. An exemplary envelope generation module 340 is a quadrature envelope generator. The envelope generation module 340 synthesizes a synthesized envelope 341 to replace the faulted envelope (321 or 322). In an exemplary embodiment, the envelope generation module 340 synthesizes the synthesized envelope 341 from the non-faulted envelope 331 and from estimated velocity 361, i.e., an estimate of the velocity co of the sensor.

As shown, the non-faulted envelope 331 and the synthesized envelope 341 are then communicated to a position calculation module 350 in control logic 325. Such a module 350 may be the same as or redundant to a position calculation module that receives two non-faulted envelopes. Position calculation module 350 calculates a sensor position 351, i.e., the position θ of the sensor, which is used for motor control.

As shown, sensor position 351 is communicated to a velocity estimation module 360. An exemplary velocity estimation module 360 is a motion state filter. The velocity estimation module 360 is configured to estimate the velocity ω of the sensor as estimated velocity 361, which is communicated to the envelope generation module 340 and used as described above.

Further, sensor position 351 is also communicated to a motor control module 370. Also, estimated velocity 361 is communicated to the motor control module 370. The motor control module 370 utilizes the estimated velocity 361 and the sensor position 351 to determine and communicate appropriate motor operation commands to the motor. The position is used to transform the motor phase currents into a reference frame that is synchronous with the rotor flux. The resulting synchronous reference frame currents, along with the estimated velocity, are then used to execute a synchronous reference frame current controller. The controller produces voltage commands to the inverter in order to generate a commanded torque in the motor.

Referring back to the envelope generation module 340, it is noted that an exemplary envelope generation module 340 may be a frequency-adapted all-pass filter. Such a filter may be used to obtain a synthesized envelope 341 that is an estimate of the faulted envelope 321 or 322 that has the same amplitude and a phase lag or lead of 90° with respect to the non-faulted envelope 331. An exemplary first order all-pass filter has unity gain across the entire frequency range of the input and a phase lag of 90° at the filter's bandwidth. The filter's bandwidth may be adapted online to be equal to the sensor's fundamental frequency, ω, to obtain the desired result.

Figure 5:
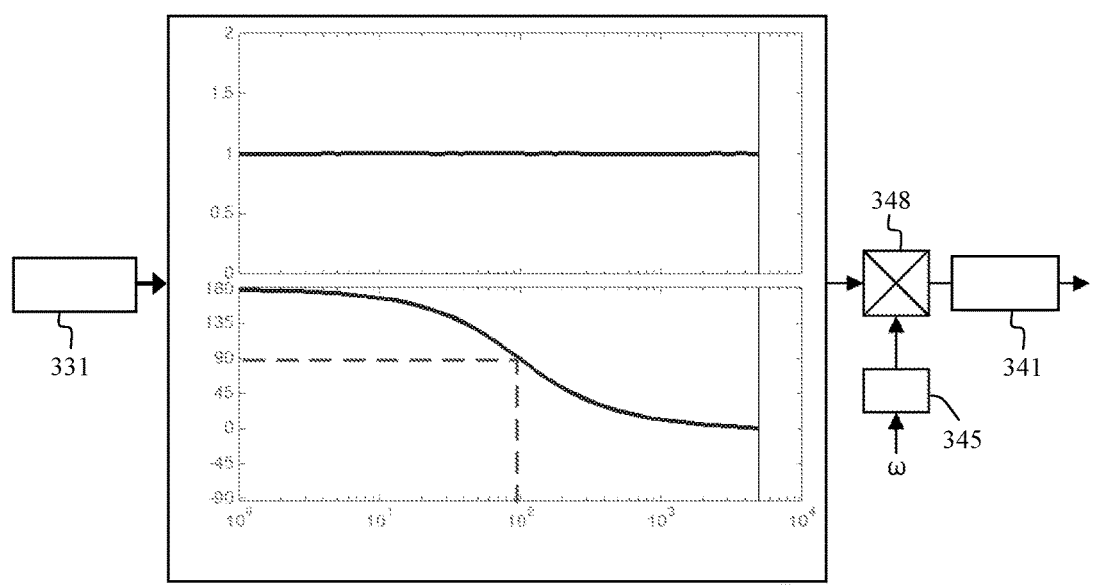
FIG. 5 is a schematic illustrating operation of a frequency-adapted all-pass filter, with exemplary bandwidth adapted to 100 radians per second, used in the system of FIG. 4, with frequency (radians per second) from $10^0$ to $10^4$ along the horizontal x-axis, phase (degrees) from −90 to 180 in the lower portion of the vertical y-axis, and magnitude (abs) from 0 to 2 in the upper portion of the vertical y-axis, in accordance with embodiments herein.

This embodiment in FIG. 5 may include S as the input in the form of non-faulted envelope 331, i.e., A*sin(θ), and a synthesized version of C as the output in the form of synthesized envelope 341, i.e., A*cos(θ). If C were the non-faulted envelope, then −C (negative C) would be the input and a synthesized version of S would be the output. In both cases, the filter output must be multiplied by the sign 345 of the velocity ω at block 348 in order to account for the direction of the motor's rotation to obtain the synthesized envelope 341.

In another embodiment, the envelope generation module 340 of FIG. 4 may be a spatial derivative filter. Such a filter may be used to obtain a synthesized envelope 341 that is an estimate of the faulted envelope 321 or 322 that has the same amplitude and a phase lag or lead of 90° with respect to the non-faulted envelope 331. An exemplary spatial derivative can be written in the continuous domain as:

$$\frac{d}{d\theta}(A\sin(\theta)) = A\cos(\theta)$$

$$\frac{d}{d\theta}(-A\cos(\theta)) = A\sin(\theta)$$

and in the discrete time domain as:

$$\frac{d}{d\theta}A\sin(\theta) \approx \frac{A\sin(\theta(k)) - A\sin(\theta(k-1))}{\omega T} \approx A\cos(\theta)$$

$$\frac{d}{d\theta}(-A\cos(\theta)) \approx \frac{-A\cos(\theta(k)) - (-A\cos(\theta(k-1)))}{\omega T} \approx A\sin(\theta)$$

The above equations show that the spatial derivative gives the same general result as the all-pass filter of FIG. 5.

As noted above, FIG. 4 illustrates a system 300 for controlling operation of the motor when one envelope signal is lost when the motor is operating above zero speed. Certain modules and equations used by the system 300 of FIG. 4, such as the envelope generation module 340, require that the velocity (speed and direction) of the sensor be known and nonzero. However, in normal use, the motor will stop and may possibly change directions. Under such conditions, the systems of FIG. 6 or FIG. 9 can be used to support continued motor control through operation near and across zero speed.

Figure 6:
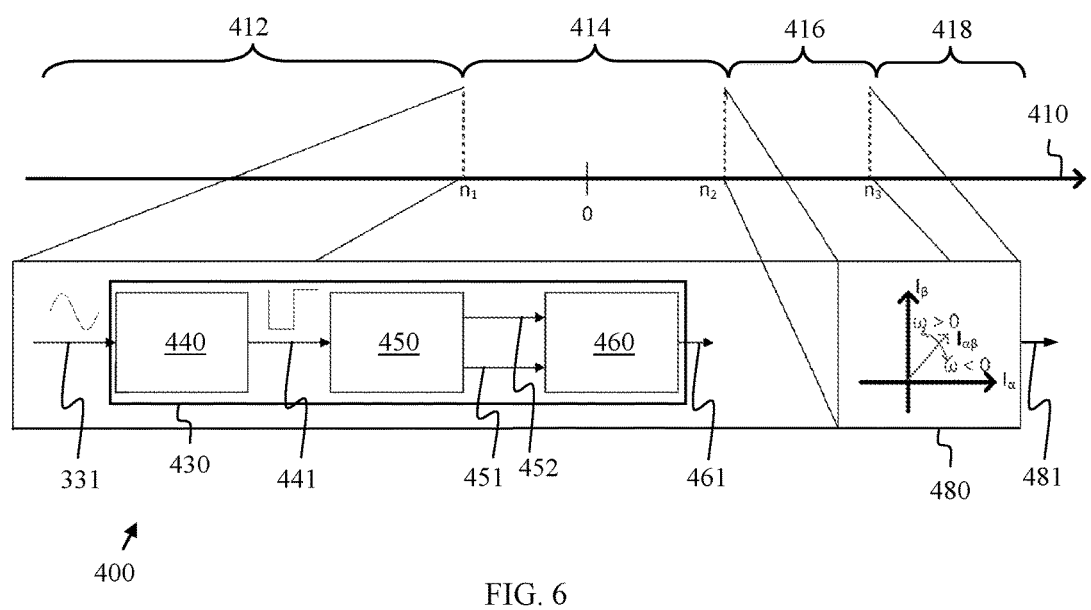
FIG. 6 is a schematic diagram of a system for controlling operation of the motor when one envelope signal is lost when the motor is operating near and/or at zero speed, including a speed-based direction determination process.
Figure 9:
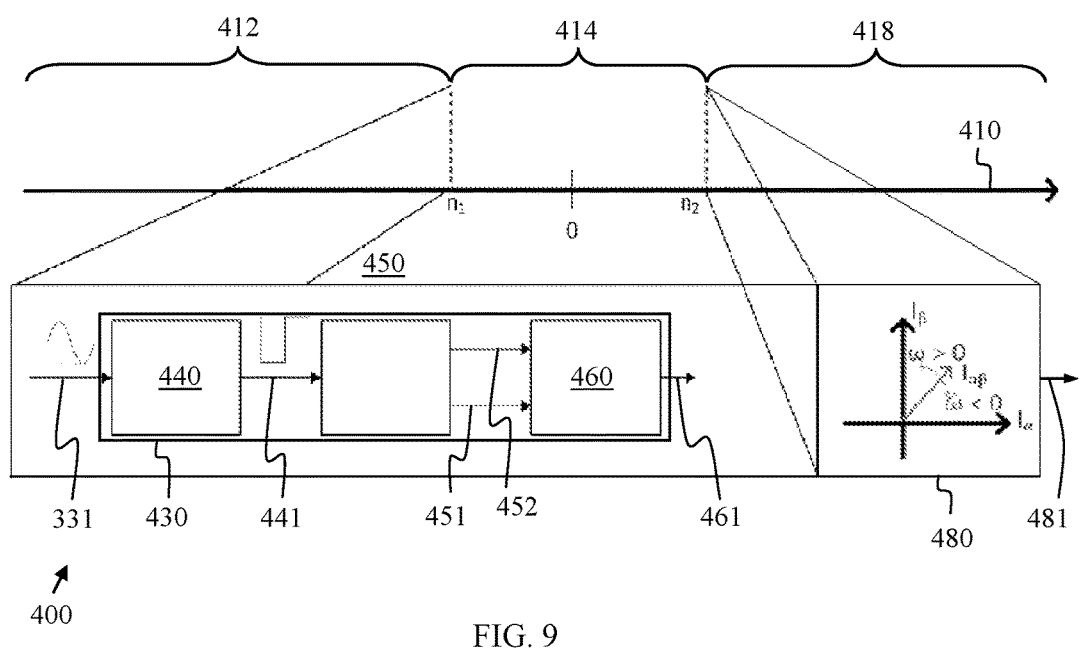
FIG. 9 is a schematic diagram of a system for controlling operation of the motor when one envelope signal is lost when the motor is operating near and/or at zero speed, including a time-based direction determination process.

FIGS. 6 and 9 each provide a schematic diagram of a system 400 for controlling operation of the motor when one envelope signal is lost when the motor is operating near and/or at zero speed. As an illustrative example, the speed in FIGS. 6 and 9 changes in the direction of arrow 410 from negative high speed (−high speed) to positive high speed (+high speed) from left to right.

Beginning at the left side of FIGS. 6 and 9, each method for operating with a single envelope described above in relation to system 300 of FIG. 4 is used at absolute motor speeds greater than or equal to the absolute value |n1| of a selected low speed, n1, i.e., in motor speed range 412. When the absolute motor speed drops to |n1|, use of the method for operating with a single envelope is paused. In the context of a resolver sensor, the absolute value |n1| of the selected low speed n1 may depend on the number of resolver lobes. In an exemplary embodiment, |n1| is from about 200 to about 400 RPM for a 2× resolver. Pause logic may be utilized to determine when to pause the method for operating with a single envelope described above in relation to FIG. 4, i.e., when to pause control of the motor based on the output signal corresponding to the motor angular position. Such logic may include determining that the absolute value of the speed of the motor is less than |n1|. When the absolute value of the motor speed is less than |n1|, the controller instructs the inverter controlling the motor to perform a three-phase open to generate no torque and no current. Thus, in motor speed range 414 no torque and no current are generated by the motor.

Below speed n1, the sensor position is considered undetectable. Yet the sensor position must be known before torque generation by the motor can be restarted. Therefore, the method includes speed detection logic 430 configured to detect an absolute speed of the motor in motor speed range 414 in response to a determined pause of the unary signal control algorithm at motor speed n1. The speed detection logic 430 may perform absolute speed sensing with one envelope. From low negative speed, n1, through a low positive speed, n2, the absolute speed of the motor is detected by speed detection logic 430. In the context of a resolver sensor, the low positive speed n2 may again depend on the number of resolver lobes. The value of low positive speed n2 may also be dependent on the motor short-circuit behavior. In an exemplary embodiment, the low positive speed n2 is from about 500 to about 700 RPM for a 2× resolver. In an exemplary embodiment, the speed detection logic 430 relies on detecting the zero crossings of the non-faulted envelope 331 to implement a low resolution speed calculation.

For example, in FIGS. 6 and 9, the speed detection logic 430 uses a two pulse-per-revolution emulated encoder method to estimate an absolute speed of the motor. As shown, in the emulated encoder method, the non-faulted envelope 331 is communicated to a zero crossing detection module 440. The zero crossing detection module 440 forms a pulse signal 441 from the non-faulted envelope 331 and communicates the pulse signal 441 to a two pulse-perrevolution (2 PPR) emulated encoder signal generation module 450. The emulated encoder signal generation module 450 generates a pulse count 451 and marks a time stamp 452 every time the non-faulted envelope 331 crosses zero.

The pulse count 451 and time stamp 452 are communicated to a low resolution speed calculation module 460. The low resolution speed calculation module 460 counts the edges of the aforementioned pulse signal 441 and, in conjunction with the time stamps 452, calculates the absolute speed 461 of the motor from an encoder signal in the well-known M, T, or M/T processes.

Figure 7:
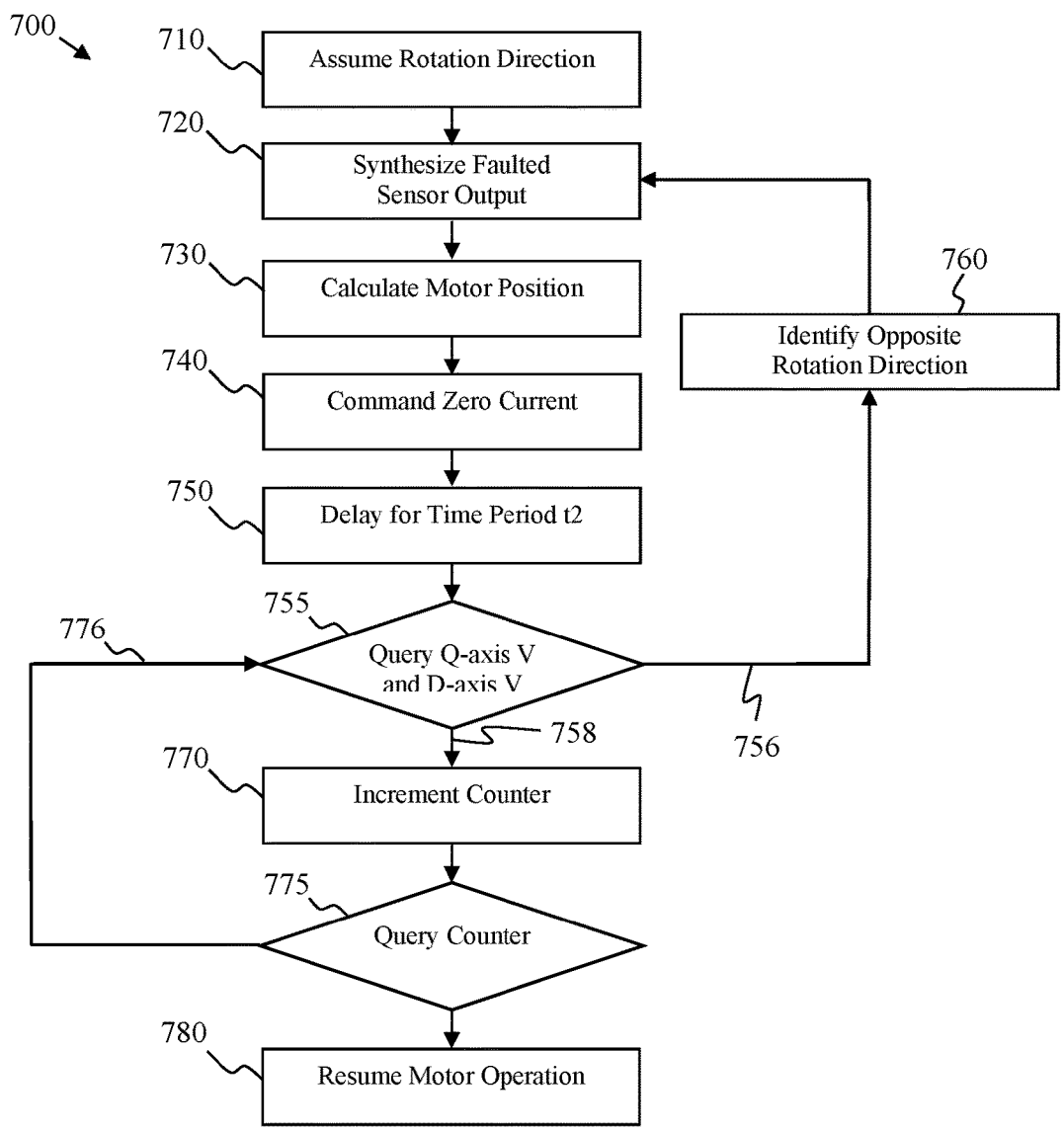
FIG. 7 provides a flow chart for a method for determining a motor's direction of rotation in accordance with embodiments herein.

FIG. 7 illustrates an exemplary method 700 for determining a motor's direction of rotation when the absolute value of speed is greater than or equal to |n2| via current regulation. In the illustrated method 700, action 710 includes assuming a direction of rotation. The initially selected direction of rotation can be based on the last known direction of rotation, the most common operating condition, or arbitrarily selected.

Action 720 includes synthesizing the faulted sensor output with the assumed direction of rotation. For example, the quadrature envelope generator will synthesize the faulted position sensor output with the assumed direction of rotation.

Method 700 includes calculating the motor position from the non-faulted and synthesized sensor outputs at action 730. For example, the quadrature envelope generator will calculate an estimate of the motor position from the non-faulted sensor output and the synthesized sensor output.

Method 700 further includes commanding zero current to the synchronous frame current regulator at action 740 and delaying for time period t2 at action 750. Specifically, method 700 includes using the calculated position to perform synchronous reference frame current control to deliver a command of zero current to the synchronous frame current regulator. To achieve zero current, the regulator must command the motor's back-EMF voltage. If the assumed direction of rotation is correct, then in the synchronous reference frame the Q-axis voltage will be substantially constant and equal to the motor speed times the permanent magnet flux linkage (i.e., will be substantially equal to the motor's back-EMF voltage) and the D-axis voltage will be substantially constant and equal to zero. In certain embodiments, a value may be "substantially constant" when the difference between the maximum absolute value |max| and the minimum absolute value |min| is less than a selected value Δ: |max|−<Δ. Other embodiments may define "substantially constant" with different techniques. If the assumed direction of rotation is incorrect, then the D- and Q-axis voltage commands will be sinusoidal at a frequency twice the motor speed with a peak magnitude approximately equal to the motor's back-EMF voltage.

Query 755 requests whether Q-axis voltage is approximately equal to the motor's back-EMF voltage and whether D-axis voltage is equal to about zero. If the Q-axis voltage is not approximately equal to the motor's back-EMF voltage or if the D-axis voltage is not approximately zero, such as at line 756, then at action 760 the opposite direction of rotation is identified, i.e., opposite to the direction of rotation last used in query 755. Method 700 then continues at action 720 by synthesizing the faulted sensor output with the direction of rotation identified at action 760.

If, at query 755, the Q-axis voltage is approximately equal to the motor's back-EMF voltage and the D-axis voltage is approximately zero, such as at line 758, then at action 770 a counter is incremented. Then query 775 is performed and requests whether the counter is greater than or equal to a predetermined threshold. If no, such as at line 776, query 755 is repeated. If yes, such as at line 778, then at action 780 motor operation is resumed using the method 500.

As a result, the check (i.e., query 755, action 770, and query 775) is continuously performed until the counter reaches the predefined threshold at query 775 and the method continues to action 780, or until the check fails at line 756 and the opposite direction of rotation is identified at action 760. This is to eliminate the possibility of resuming motor operation due to a single instance of the Q-axis voltage being approximately equal to the motor's back-EMF voltage and the D-axis voltage being approximately zero. Such an instance will occur periodically if the voltage commands are sinusoidally varying at twice the motor speed if the assumed direction is incorrect.

If it is determined through logic that the direction of rotation is incorrect at query 755 and the opposite direction of rotation is identified at action 760, the check on the DQ-voltage commands will be repeated after actions 720, 730, 740 and 750. When the check on the DQ-voltage commands passes (since the assumed direction of rotation has been flipped) motor operation can resume at action 780.

Referring back to FIG. 6, in another embodiment, the speed detection logic 430 uses a speed ceiling calculation. The speed ceiling calculation is used to determine if the absolute speed is less than a selected value. The speed ceiling calculation compares the time interval between two zero crossings of the non-faulted envelope to a threshold calculated offline that corresponds to the speed of interest, i.e., n2. This value can be estimated as:

$$t_{n2} = \frac{30}{(n_2)(\text{Sensor MultiplicationFactor})}$$

Figure 8:
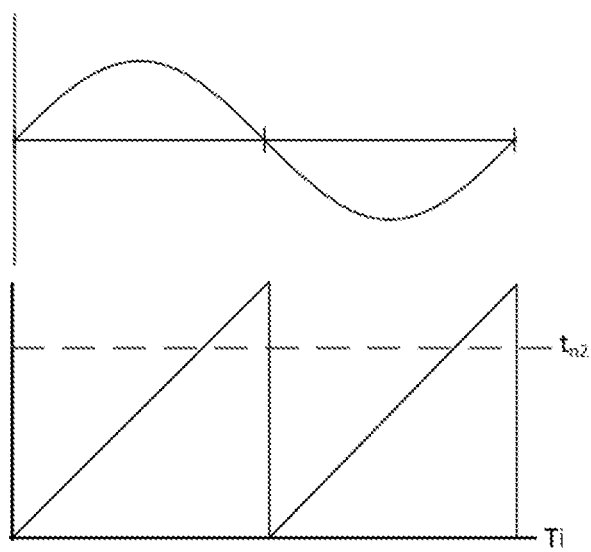
FIG. 8 is a graph illustrating a speed ceiling calculation used for the speed detection logic of FIG. 6 and FIG. 9, with time (T) along the horizontal x-axis, a zero crossing time counter at the lower portion of the y-axis, and a non-faulted envelope at the upper portion of the y-axis, in accordance with embodiments herein.

If the time interval between two zero crossings of the non-faulted envelope is greater than or equal to $t_{n2}$, then the absolute value of the speed is less than |n2|, i.e., below the ceiling of |n2|. This embodiment is illustrated in FIG. 8.

In an embodiment, a speed ceiling calculation is performed by starting a timer upon detecting a first zero crossing of the non-faulted envelope. Then, by monitoring or checking the timer continuously until the next zero crossing of the non-faulted envelope is detected. If the timer reaches tn2 before the next zero crossing occurs, then the absolute speed is less than |n2|.

Referring back to FIG. 6, the system 400 for controlling operation of the motor when one envelope signal is lost when the motor is operating near and/or at zero speed further includes direction detection logic 480 configured to detect a direction of rotation of the motor, such as a PMAC motor. The direction detection logic 480 of FIG. 6 is speed-based and may be directed to detect a direction of rotation of the motor after, or in response to a detection of the absolute speed as being equal to or greater than or equal to selected positive speed n2. Specifically, after the low resolution speed calculation module 460 determines the absolute speed 461 to be at least |n2|, the direction detection logic 480 detects the direction of rotation of the motor. In an exemplary embodiment, the direction detection logic 480 uses a three-phase short current-based detection method or a current regulator-based detection method.

FIG. 6 illustrates a three-phase short circuit current-based embodiment, which is well understood. The current regulator-based embodiment includes commanding zero current to a synchronous reference frame current controller and inspecting the resulting voltage commands. When this is active, the quadrature envelope generator may be used with an assumed direction to provide an angle for the dq transformation needed for the synchronous current regulator. If the assumed direction is correct, the voltage command outputs of the current regulator will be relatively constant. If the assumed direction is incorrect, the voltage commands will vary sinusoidally at twice the motor's electrical frequency.

While the direction detection logic 480 determines the direction 481 in motor speed range 416, the speed detection logic 430 continues to detect an absolute speed 461 of the motor. After the direction 481 has been determined and the absolute speed 461 is determined to be sufficiently high enough, i.e., at least equal to |n3|, single-envelope operation as described in FIG. 4 may be restarted and torque capability is recovered at motor speed range 418. In an exemplary embodiment, n3 is from about 600 to about 800 RPM. In an exemplary embodiment, the determination to restart control of the motor using the single-envelope operation described in FIG. 4 may be performed by restart logic.

FIG. 9 illustrates a direction detection logic 480 that is time-based and may be directed to detect a direction of rotation of the motor after, or in response to an estimation of the absolute speed at or above a selected absolute speed |n2|. Specifically, after the low resolution speed calculation module 460 determines the absolute speed 461 to be at least |n2|, the direction detection logic 480 detects the direction of rotation of the motor. In an exemplary embodiment, the direction detection logic 480 uses a three-phase short current-based detection method or a current regulator-based detection method.

FIG. 9 again illustrates a three-phase short circuit current-based embodiment, which is well understood. The current regulator-based embodiment includes commanding zero current to a synchronous reference frame current controller and inspecting the resulting voltage commands. When this is active, the quadrature envelope generator may be used with an assumed direction to provide an angle for the dq transformation needed for the synchronous current regulator. If the assumed direction is correct, the voltage command outputs of the current regulator will be relatively constant. If the assumed direction is incorrect, the voltage commands will vary sinusoidally at twice the motor's electrical frequency.

In FIG. 9, the direction detection logic 480 determines the direction 481 for a predetermined time interval, t1. After the direction 481 has been determined and the time interval has passed, then single-envelope operation as described in FIG. 4 may be restarted and torque capability is recovered at motor speed range 418. In an exemplary embodiment, the determination to restart control of the motor using the single-envelope operation described in FIG. 4 may be performed by restart logic.

Figure 10:
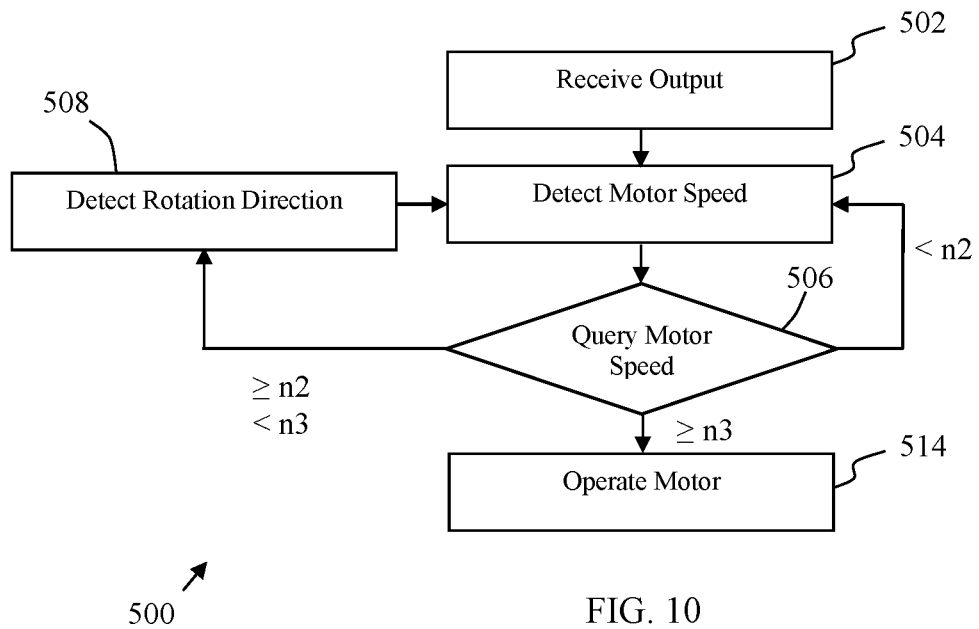
FIG. 10 provides a flow chart for a method for operating a motor during a near-zero mode of operation in accordance with embodiments herein.

FIG. 10 illustrates an embodiment of a method 500 for operating a permanent magnet alternating current (PMAC) motor including a rotor, a three-phase inverter coupled to the motor and configured to provide a voltage to the motor, and a controller coupled to the inverter and to the motor. Method 500 may be utilized as motor control when riding through conditions where the motor comes to a stop and possibly changes directions and may be considered to be a near-zero speed mode of operation. Method 500 of FIG. 10 illustrates a speed-based direction determination process similar to FIG. 6.

As shown, the method 500 in FIG. 10 includes receiving with the controller an output at action 502. For example, the controller may receive an output corresponding to a motor angular position. In certain embodiments, the output is a sine envelope signal or a cosine envelope signal.

Method 500 further comprises detecting with the controller a motor speed based on the motor angular position at action 504. For example, the controller may estimate the motor speed based on the motor angular position by performing a two pulse-per-revolution emulated encoder method, may determine if the absolute motor speed is less than a selected absolute value by performing a speed ceiling calculation, or may detect motor speed by performing another suitable technique and/or calculation.

Query 506 requests whether the absolute motor speed is less than selected value |n2|, greater than or equal to |n2| and less than selected value |n3|, or greater than or equal to |n3|. If the absolute motor speed is less than |n2|, then the method continues by repeating action 504. If the absolute motor speed is greater than or equal to |n2| and less than selected value |n3|, then the method continues at action 508 by detecting the direction of rotation of the motor. For example, the controller may performing a three-phase short current-based detection process, a current regulator-based detection process, or another suitable process to detect the direction of rotation of the motor.

If the absolute motor speed is greater than or equal to |n3|, then the method continues at action 514 where the controller may operate the motor to produce torque in view of the known motor speed and rotation direction, according to the single-envelope operation as described in FIG. 4. Generally, action 514 may be considered to include operating the motor to produce torque following method 600.

Figure 11:
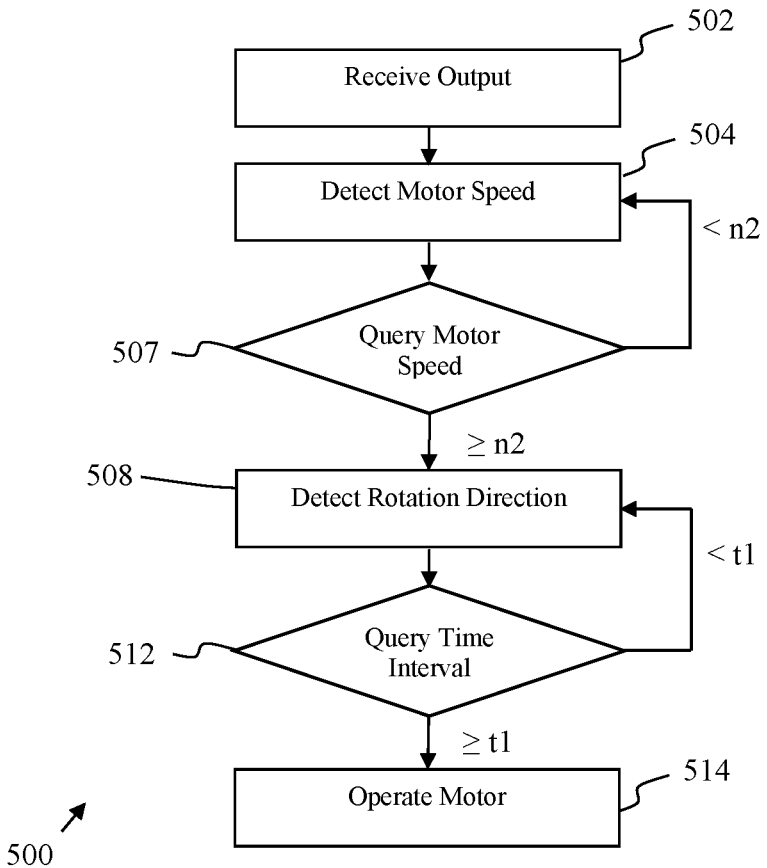
FIG. 11 provides a flow chart for a method for operating a motor during a near-zero mode of operation in accordance with embodiments herein.

FIG. 11 illustrates another embodiment of method 500 for operating a permanent magnet alternating current (PMAC) motor including a rotor, a three-phase inverter coupled to the motor and configured to provide a voltage to the motor, and a controller coupled to the inverter and to the motor. Method 500 may be utilized as motor control when riding through conditions where the motor comes to a stop and possibly changes directions and may be considered to be a near-zero speed mode of operation. Method 500 of FIG. 11 illustrates a time-based direction determination process similar to FIG. 9.

As shown, the method 500 includes receiving with the controller an output at action 502. For example, the controller may receive an output corresponding to a motor angular position. In certain embodiments, the output is a sine envelope signal or a cosine envelope signal.

Method 500 further comprises detecting with the controller a motor speed based on the motor angular position at action 504. For example, the controller may detect the motor speed by estimating the motor speed based on the motor angular position via a two pulse-per-revolution emulated encoder method or by performing another suitable technique. Further, the controller may detect the motor speed based on a speed ceiling calculation.

Query 507 requests whether the absolute motor speed is less than selected value |n2| or greater than or equal to |n2|. If the absolute motor speed is less than |n2|, then the method continues by repeating action 504. If the motor speed is greater than or equal to |n2|, then the method continues at action 508 by detecting the direction of rotation of the motor. For example, the controller may performing a three-phase short current-based detection process, a current regulator-based detection process, or another suitable process to detect the direction of rotation of the motor.

Query 512 prompts whether the time interval after commencing detection of the rotation direction at action 508 is greater than or equal to a predetermined time interval, t1. If the time interval is not greater than or equal to t1, then the method 500 continues detecting the rotation direction at action 508. If the time interval is greater than or equal to t1, then the method continues at action 514 where the controller may operate the motor to produce torque in view of the known motor speed and rotation direction, according to the single-envelope operation as described in FIG. 4. Generally, action 514 may be considered to include operating the motor to produce torque following method 600.

Figure 12:
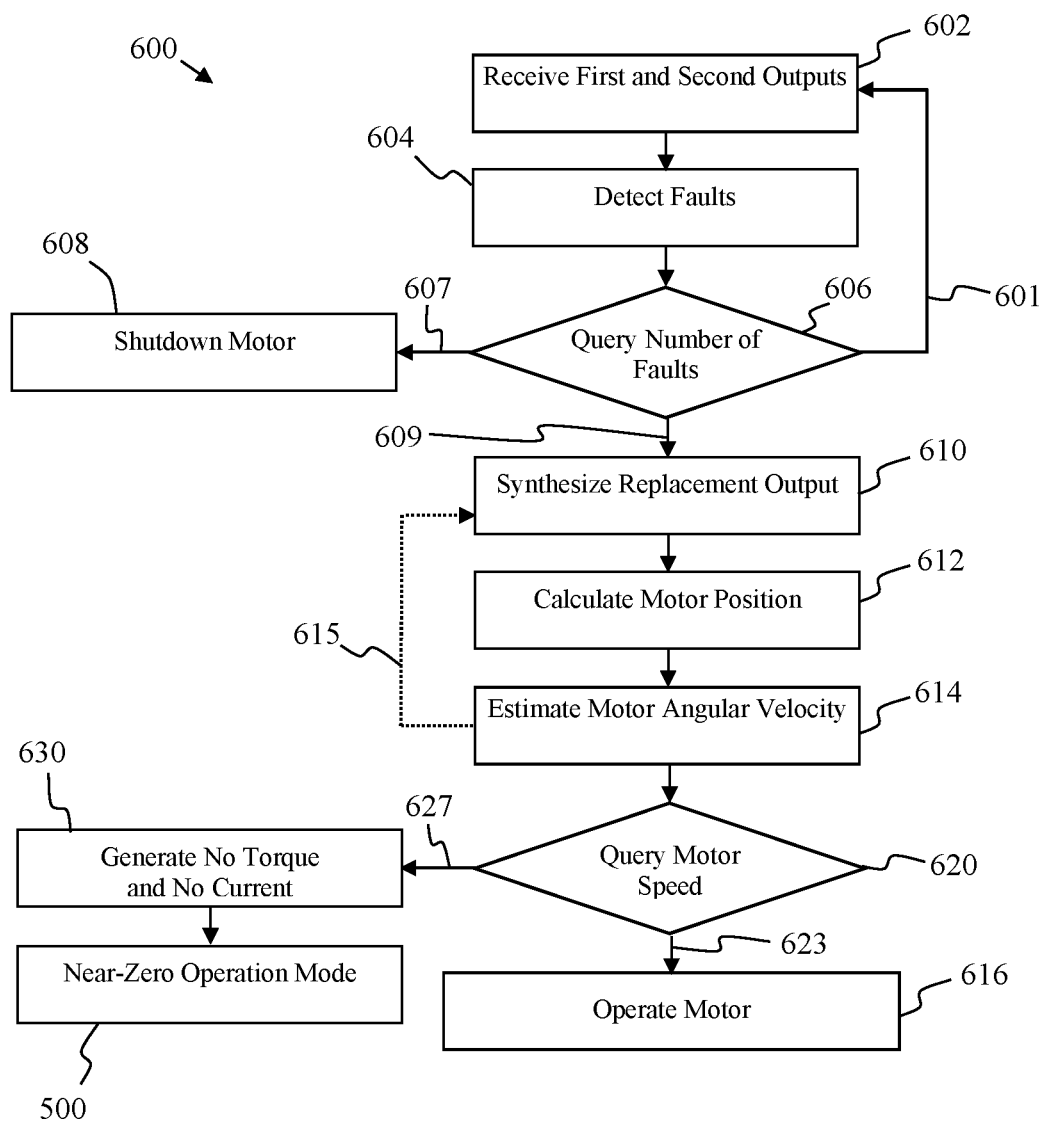
FIG. 12 provides a flow chart for a method for operating a motor in accordance with embodiments herein.

FIG. 12 illustrates a method 600 for operating a motor. As shown, method 600 includes receiving outputs, such as receiving two outputs corresponding to a motor angular position, at action 602 with a controller. Specifically, the controller may receive a sine envelope signal and a cosine envelope signal. Such signals may be provided by a position sensor coupled to the motor. An exemplary position sensor may be a resolver or a magneto-resistive sensor, an eddy current sensor, or another suitable sensor.

Method 600 includes detecting faults at action 604, wherein the controller analyzes the outputs to detect if both, either or neither is faulted. Query 606 asks whether both output are faulted, whether neither outputs are faulted, or whether one output is faulted. If both outputs are faulted, such as at line 607, then the motor is shutdown at action 608. If neither output is faulted, such as at line 601, then the method continues by repeating action 602 while normal two-output motor control is maintained. If one output is faulted, such as at line 609, then the method continues at action 610. For example, action 604 and query may determine that the first output is not faulted and that the second output is faulted.

Method 600 includes synthesizing a replacement output at action 610, wherein the controller synthesizes a replacement or substitute for the faulted second output. Specifically, the controller synthesizes the synthesized second output from the non-faulted first output and from an estimated motor angular velocity. For example, the controller may utilize a quadrature envelope generator to synthesize the synthesized second output. In an exemplary embodiment, the quadrature envelope generator is a frequency-adapted all-pass filter, a spatial derivative filter, or another suitable module that obtains a synthesized envelope that is an estimate of the faulted envelope and that has the same amplitude and a phase lag or lead of 90° with respect to the non-faulted envelope.

Method 600 continues by calculating motor position at action 612, wherein the controller calculates the motor angular position. For example, the controller may calculate the motor angular position using the non-faulted first output and from the synthesized second output as the conventional sine envelope signal and a cosine envelope signal, such as by taking the four-quadrant inverse tangent of the signal envelopes, or by another suitable process.

Method 600 includes estimating motor angular velocity at action 614, wherein the controller estimates a motor angular velocity from the motor angular position. For example, a motion state filter may be used to estimate the motor angular velocity. As shown by arrow 615, the estimated motor angular velocity is used in action 610 to synthesize the replacement output. Further, method 600 includes operating the motor to produce torque based on the motor angular position and the motor angular velocity at action 616. Method 600 is continuously repeated as outputs are received at action 602.

While actions 610-616 provide for appropriate operation of the motor when the motor speed is greater than or equal to the absolute value |n1| of selected low speed, n1, a motor at zero speed necessitates use of different processing. Therefore, query 620 follows action 614 of estimating the motor angular velocity, and prompts whether the absolute motor speed is greater than or equal to the absolute value |n1|.

If the absolute motor speed is greater than or equal to |n1|, such as at line 623, then the method proceeds with action 616, wherein the controller operates the motor to produce torque based on the motor angular position and the motor angular velocity.

If, however, the absolute motor speed is identified as being less than |n1|, such as at line 627, then the method 600 provides for controlling the motor to generate no torque and no current at action 630. After controlling the motor to generate no torque and no current, the near-zero mode of operation disclosed as method 500 is performed. During the near-zero mode of operation, the torque does not remain at zero, rather the motor will generate some torque while the direction determination occurs. Action 514 of method 500 may be considered to be action 616 in method 600.

For performing method 500 and method 600, the controller may be provided with contingency control logic configured to perform a unary signal control algorithm for controlling the motor based on only one output signal corresponding to a motor angular position. Further, the exemplary motor includes pause logic configured to determine when to pause controlling the motor based on the output signal corresponding to the motor angular position. The controller includes speed detection logic configured to detect an absolute speed of the motor in response to a determined pause of the unary signal control algorithm, and direction detection logic configured to detect a direction of rotation of the motor in response to detection of the absolute speed above a selected speed. Further, the controller includes restart logic configured to determine when to restart the unary signal control algorithm based on the absolute speed of the motor.

In an exemplary embodiment, the controller further also includes primary control logic configured to perform a binary signal control algorithm for controlling the motor based on two output signals corresponding to the motor angular position, and fault detection logic configured to identify that a second output signal corresponding to the motor angular position is faulted and to switch control of the motor from the primary control logic to the contingency control logic.

As described herein, systems and methods are provided for operating a motor based on a single motor position signal. Further, systems and methods provide for such operation at high speeds and at near-zero speeds. As a result, vehicle shutdown can be avoided when a motor position signal is faulted.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the claimed subject matter in any way. Rather, the foregoing detailed description will provide those skilled in the art with a convenient road map for implementing an exemplary aspect of the subject matter. It being understood that various changes may be made in the function and arrangement of elements described in an exemplary aspect without departing from the scope of the subject matter as set forth in the appended claims.

What is claimed is:

1. A method for operating a motor, the method comprising:
   receiving a first output from a motor electric position sensor;
   receiving a second output from the motor electric position sensor;
   determining that the first output is not faulted;
   determining that the second output is faulted;
   synthesizing a synthesized second output from the first output and from an estimated motor angular velocity;
   calculating a motor angular position from the first output and the synthesized second output;
   estimating a motor angular velocity from the motor angular position; and
   operating the motor to produce torque based on the motor angular position and the motor angular velocity.

2. The method of claim 1 wherein the first output is a sine envelope signal or a cosine envelope signal.

3. The method of claim 1 wherein a vector-based position sensor coupled to the motor provides the first output.

4. The method of claim 1 wherein the first output is created by a resolver, a magneto-resistive sensor, a Hall effect sensor, or an eddy current sensor.

5. The method of claim 1 wherein a quadrature envelope generator synthesizes the synthesized second output from the first output and the estimated motor angular velocity.

6. The method of claim 5 wherein the quadrature envelope generator is a frequency-adapted all-pass filter or a spatial derivative filter.

7. The method of claim 1 wherein the method operates the motor to produce torque based on the motor angular position and the estimated motor angular velocity when an absolute motor speed is greater than or equal to a selected absolute value |n1|, and wherein the method further comprises:
   identifying that the absolute motor speed is less than the selected absolute value |n1|; and
   after identifying that the absolute motor speed is less than the selected absolute value |n1|, controlling the motor to generate no torque and no current.

8. The method of claim 7 further comprising:
   after initially controlling the motor to generate no torque and no current, determining that the absolute motor speed is greater than or equal to a selected value |n2|, generating torque with the motor, and detecting a direction of rotation of the motor.

9. The method of claim 8 wherein determining that the absolute motor speed is greater than or equal to a selected value |n2| comprises performing a two pulse-per-revolution emulated encoder process or performing a speed ceiling calculation.

10. The method of claim 7 further comprising:
    after initially controlling the motor to generate no torque and no current, determining that the absolute motor speed is greater than or equal to a selected value |n2|, generating torque with the motor and detecting a direction of rotation of the motor, and, after a time interval t1 from determining that the absolute motor speed is greater than or equal to a selected value |n2|, operating the motor to produce torque based on the motor angular position and the motor angular velocity.

11. The method of claim 8 wherein detecting the direction of rotation of the motor comprises performing a three-phase short current-based detection process or performing a current regulator-based detection process.

12. The method of claim 8 further comprising:
    determining that the absolute motor speed is greater than or equal to a selected value n3, wherein the absolute value of |n3| is greater than or equal to the absolute value of |n2|; and
    after identifying that the absolute motor speed is greater than or equal to a selected value n3, operating the motor to produce torque based on the motor angular position and the motor angular velocity.

13. A method for operating a motor, the method comprising:
    receiving a first output from a motor electric position sensor;
    synthesizing a synthesized second output from the first output and from an estimated motor angular velocity, wherein a quadrature envelope generator synthesizes the synthesized second output from the first output and the estimated motor angular velocity, and wherein the quadrature envelope generator is a frequency-adapted all-pass filter or a spatial derivative filter;
    calculating a motor angular position from the first output and the synthesized second output;
    estimating a motor angular velocity from the motor angular position; and
    operating the motor to produce torque based on the motor angular position and the motor angular velocity.

14. The method of claim 13 wherein the first output is a sine envelope signal or a cosine envelope signal.

15. The method of claim 13 wherein the method operates the motor to produce torque based on the motor angular position and the estimated motor angular velocity when an absolute motor speed is greater than or equal to a selected absolute value |n1|, and wherein the method further comprises:
    identifying that the absolute motor speed is less than the selected absolute value |n1|; and
    after identifying that the absolute motor speed is less than the selected absolute value |n1|, controlling the motor to generate no torque and no current.

16. The method of claim 15 further comprising:
    after initially controlling the motor to generate no torque and no current, determining that the absolute motor speed is greater than or equal to a selected value |n2|, generating torque with the motor, and detecting a direction of rotation of the motor;
    determining that the absolute motor speed is greater than or equal to a selected value n3, wherein the absolute value of |n3| is greater than or equal to the absolute value of |n2|; and
    after identifying that the absolute motor speed is greater than or equal to a selected value n3, operating the motor to produce torque based on the motor angular position and the motor angular velocity.

17. The method of claim 15 further comprising:
    after initially controlling the motor to generate no torque and no current, determining that the absolute motor speed is greater than or equal to a selected value |n2|, generating torque with the motor and detecting a direction of rotation of the motor, and, after a time interval t1 from determining that the absolute motor speed is greater than or equal to a selected value |n2|, operating the motor to produce torque based on the motor angular position and the motor angular velocity.

18. A method for operating a motor, the method comprising:
- receiving a first output from a motor electric position sensor;
- synthesizing a synthesized second output from the first output and from an estimated motor angular velocity;
- calculating a motor angular position from the first output and the synthesized second output;
- estimating a motor angular velocity from the motor angular position;
- operating the motor to produce torque based on the motor angular position and the motor angular velocity when an absolute motor speed is greater than or equal to a selected absolute value |n1|;
- identifying that the absolute motor speed is less than the selected absolute value |n1|; and
- after identifying that the absolute motor speed is less than the selected absolute value |n1|, controlling the motor to generate no torque and no current.

19. The method of claim 18 further comprising:
- after initially controlling the motor to generate no torque and no current, determining that the absolute motor speed is greater than or equal to a selected value |n2|, generating torque with the motor, and detecting a direction of rotation of the motor.

20. The method of claim 19 wherein determining that the absolute motor speed is greater than or equal to a selected value |n2| comprises performing a two pulse-per-revolution emulated encoder process or performing a speed ceiling calculation.

21. The method of claim 19 wherein detecting the direction of rotation of the motor comprises performing a three-phase short current-based detection process or performing a current regulator-based detection process.

22. The method of claim 19 further comprising:
- determining that the absolute motor speed is greater than or equal to a selected value n3, wherein the absolute value of |n3| is greater than or equal to the absolute value of |n2|; and
- after identifying that the absolute motor speed is greater than or equal to a selected value |n3|, operating the motor to produce torque based on the motor angular position and the motor angular velocity.

* * * * *